Figure 1:
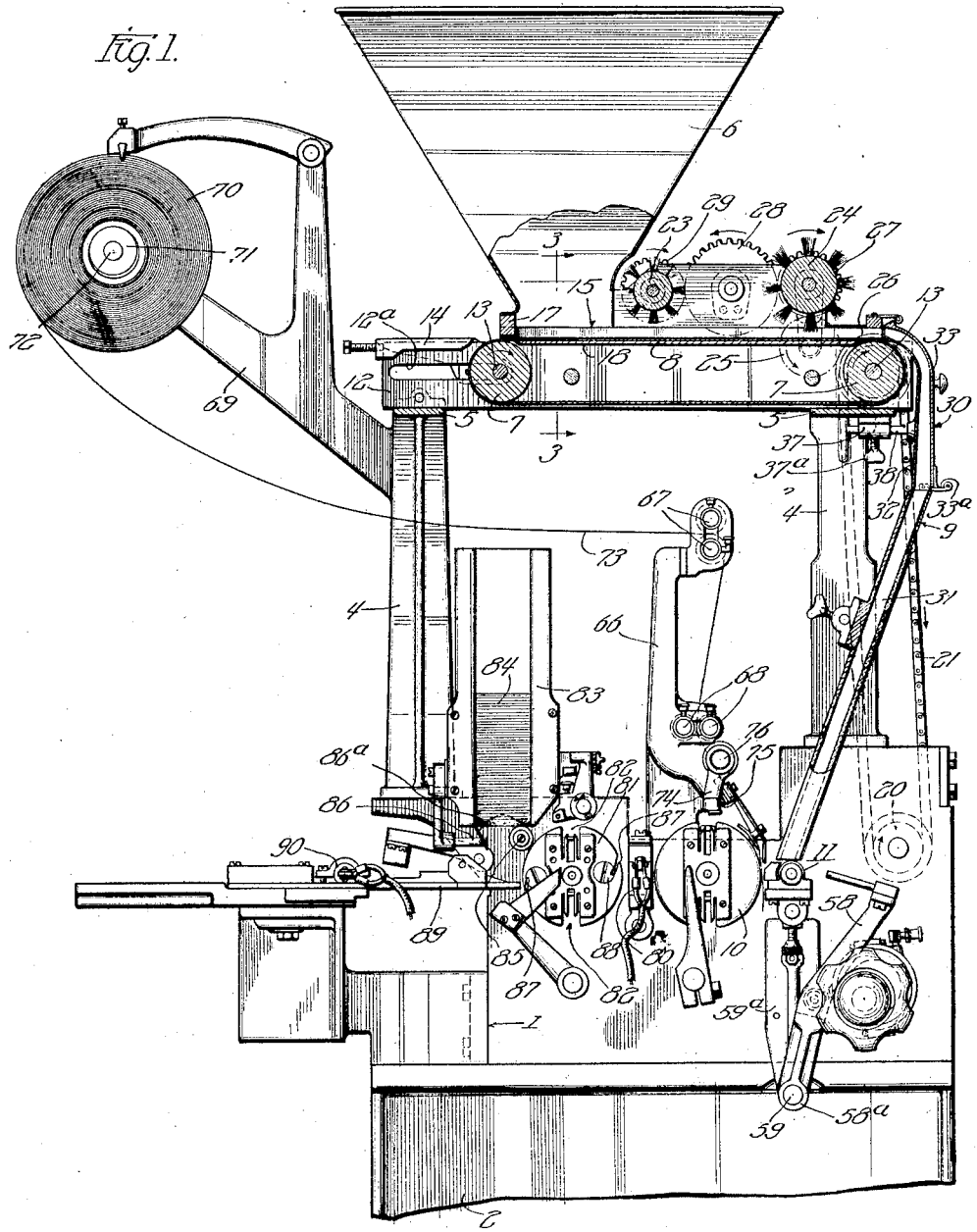

Jan. 29, 1924.  1,482,014
C. W. JOHNSON
WRAPPING MACHINE
Filed July 26, 1920  6 Sheets-Sheet 1

Inventor
Charles W. Johnson
Offield, Pooler & Hinton
Attys.

Jan. 29, 1924.

C. W. JOHNSON 1,482,014

WRAPPING MACHINE

Filed July 26, 1920

6 Sheets-Sheet 2

Inventor
Charles W. Johnson
Offield, Towle & Linthicum
Attys.

Jan. 29, 1924.  1,482,014
C. W. JOHNSON
WRAPPING MACHINE
Filed July 26, 1920  6 Sheets-Sheet 3
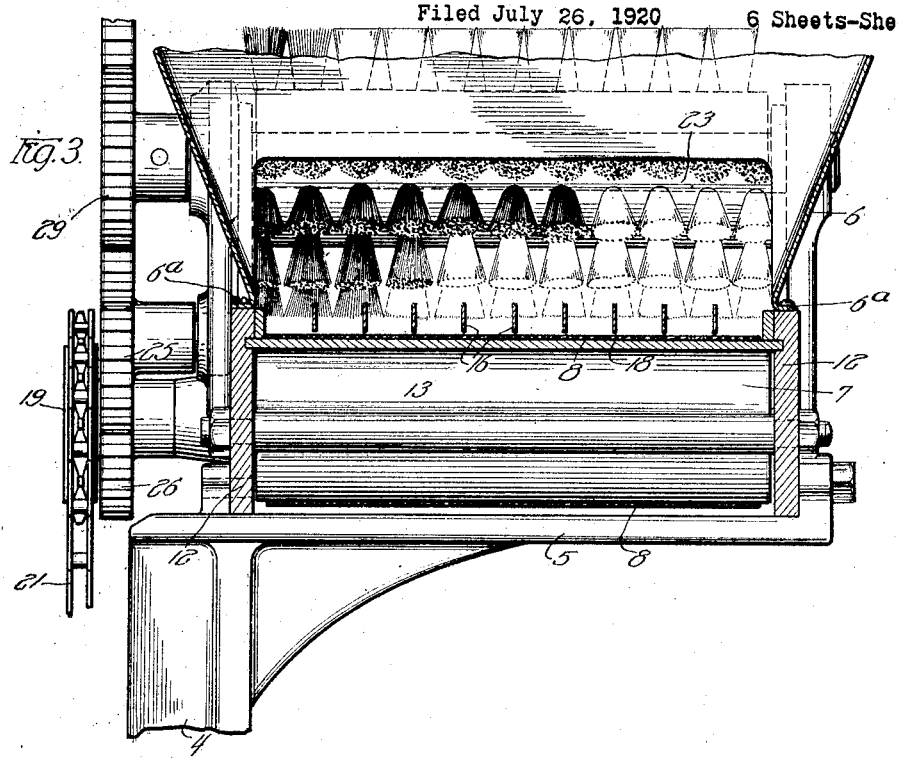
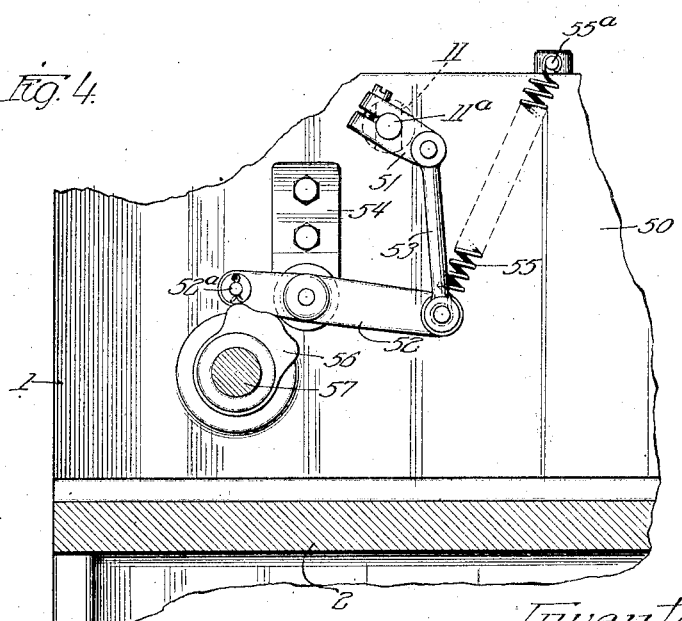
Inventor
Charles W. Johnson Jan. 29, 1924.

C. W. JOHNSON

WRAPPING MACHINE

Filed July 26, 1920

1,482,014

6 Sheets-Sheet 4

Inventor
Charles W. Johnson

Jan. 29, 1924.　　　　　　　　　　　　　　　　1,482,014
C. W. JOHNSON
WRAPPING MACHINE
Filed July 26, 1920　　　　6 Sheets-Sheet 5

Inventor
Charles W. Johnson

Jan. 29, 1924.
C. W. JOHNSON
WRAPPING MACHINE
Filed July 26, 1920
1,482,014
6 Sheets-Sheet 6
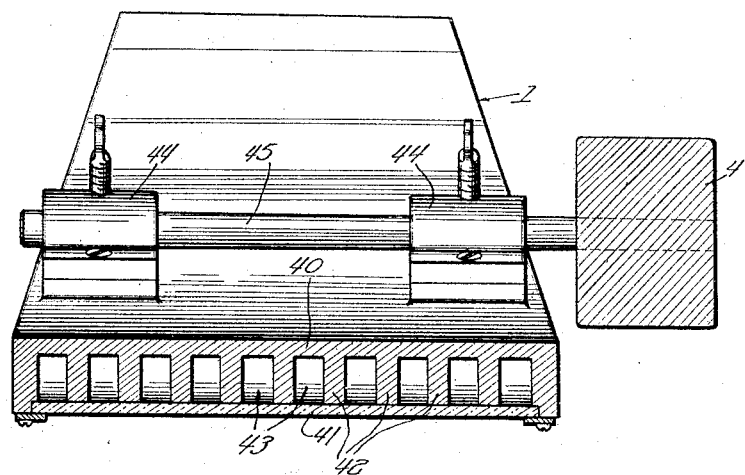
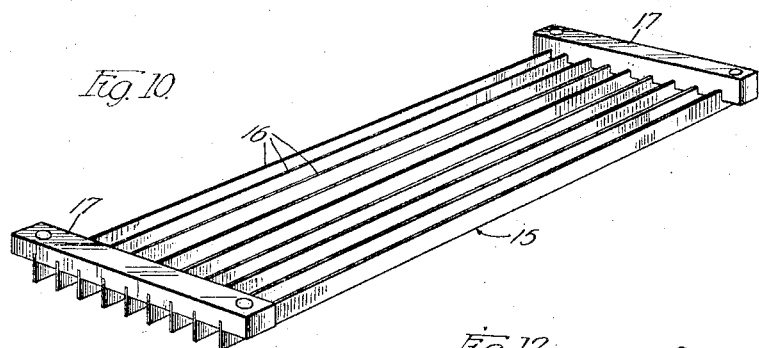
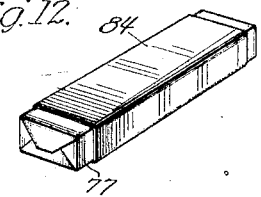
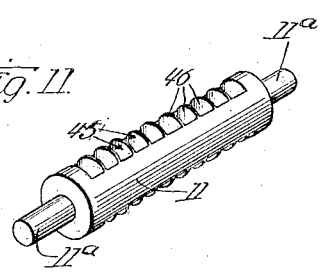
Inventor
Charles W. Johnson
Attys.

Patented Jan. 29, 1924.

1,482,014

UNITED STATES PATENT OFFICE.

CHARLES W. JOHNSON, OF CHICAGO, ILLINOIS, ASSIGNOR TO WM. WRIGLEY JR. COMPANY, OF CHICAGO, ILLINOIS, A CORPORATION OF WEST VIRGINIA.

WRAPPING MACHINE.

Application filed July 26, 1920. Serial No. 399,051.

*To all whom it may concern:*

Be it known that I, CHARLES W. JOHNSON, a citizen of the United States, and a resident of Chicago, in the county of Cook and State of Illinois, have invented certain new and useful Improvements in Wrapping Machines, of which the following is a specification.

This invention relates to improvements in wrapping machines, and more particularly to machines for wrapping small articles, such as pieces of chewing gum of lozenge shape, into packages containing a desired number of pieces to form a convenient sized package.

In the accompanying drawings are illustrated those parts of the wrapping machine designed for the purpose of wrapping pieces of chewing gum having the form hereinbefore suggested, the novel features of this particular machine being directed toward the means for arranging the pieces in proper form to be introduced into the wrapping mechanism, whereby a wrapper of paraffin paper is applied and sealed, and an outside wrapper or band applied.

The parts of the machine constituting the wrapping mechanism may be said to conform generally to similar mechanism found in wrapping machines employed for wrapping chewing gum in the familiar "stick" form. Such a machine, for instance, is fully illustrated and described in the patent granted to Albert M. Price on June 6, 1916, and bearing No. 1,185,822.

The packaging and wrapping of lozenge shaped pieces presents a different problem than that of wrapping the usual "stick" form of chewing gum, owing to the difference in shape, it being a comparatively simple matter in the latter instance to feed the sticks to the machine from a magazine in which the sticks may be deposited in uniform manner, whereas in the case of small lozenge shaped pieces, they can be more efficiently handled by introducing them into a hopper, and then arranged in a uniform manner for wrapping by mechanical means.

Figure 2:
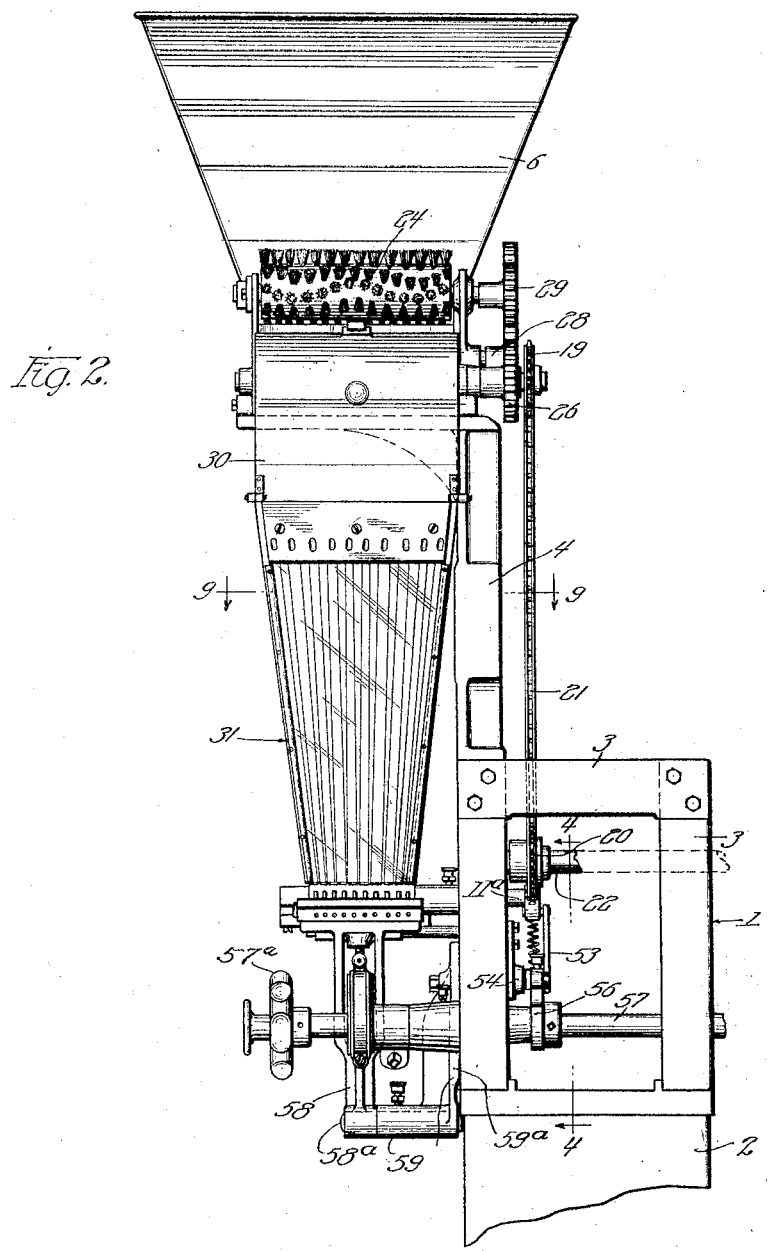
Figure 5:
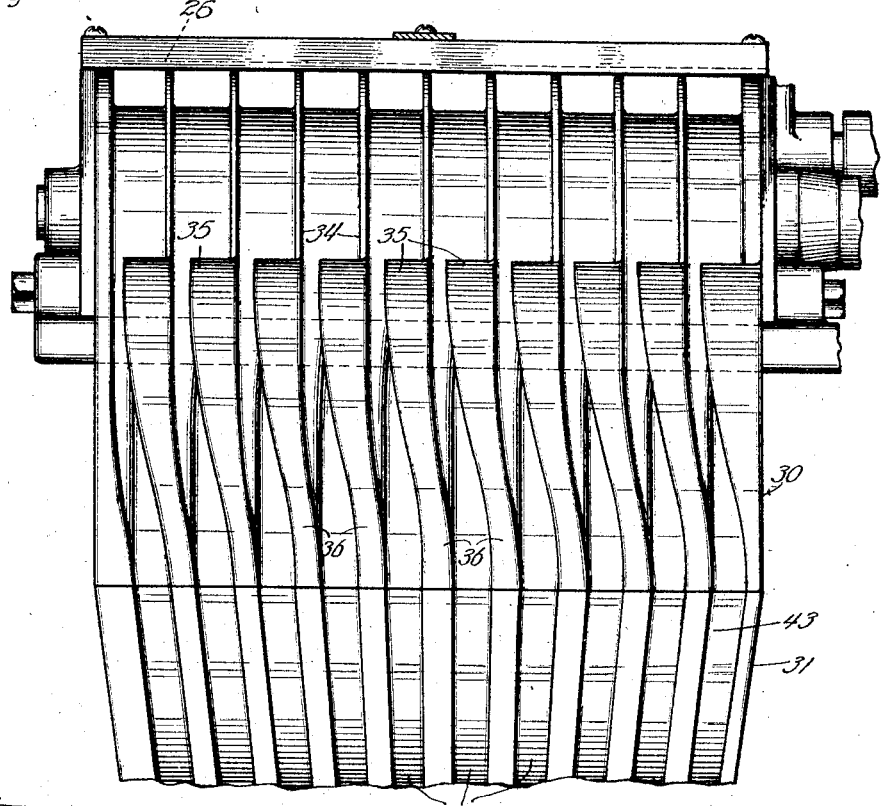
Figure 6:
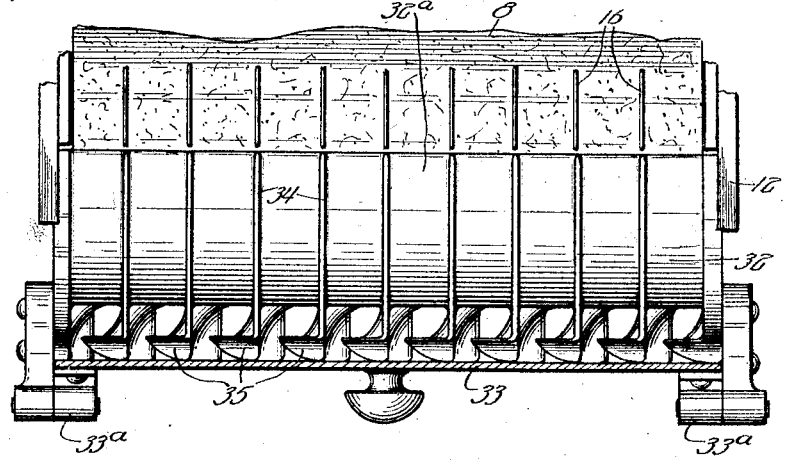
Figure 7:
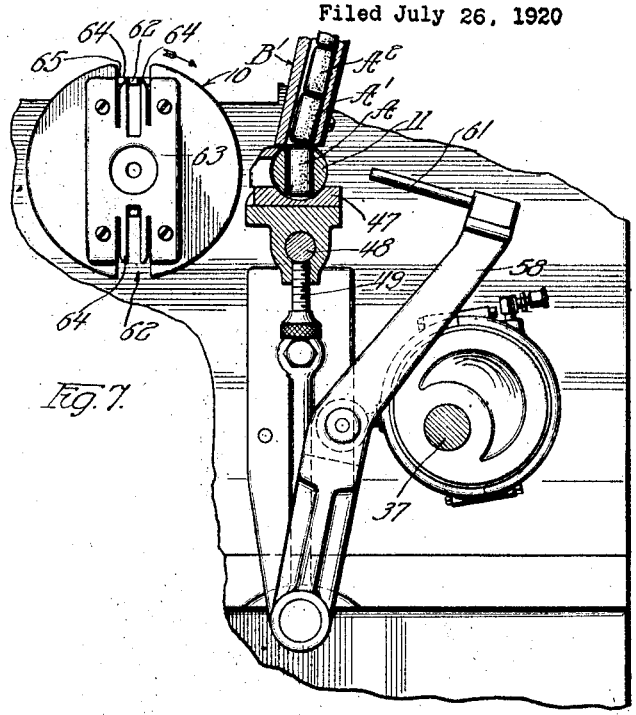
Figure 8:
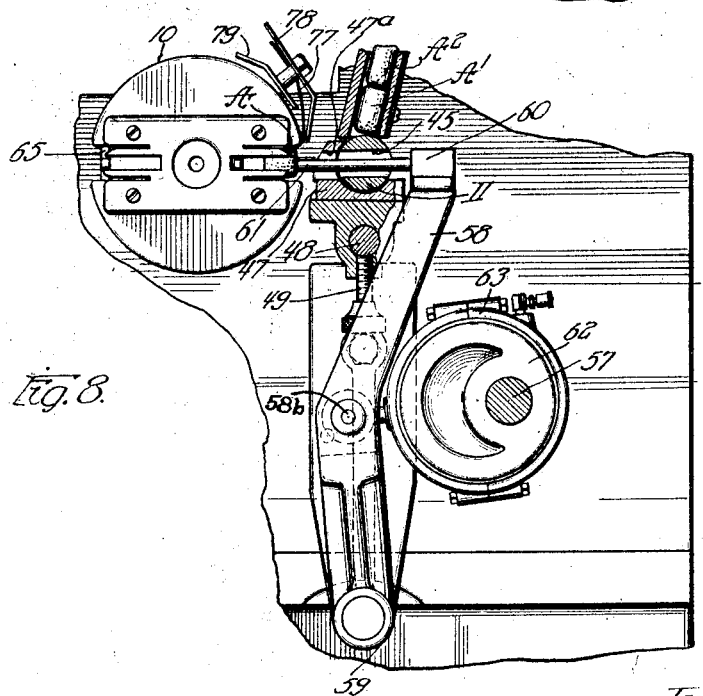

The object of this invention, therefore, is to provide a feeding mechanism associated with the wrapping parts of the wrapping machine, whereby the uniform arrangement and advancement of the pieces is carried on continuously from the main feed hopper to the point where they are introduced into the wrapping mechanism in the proper form for producing the desired shape and size of package. In the drawings, Figure 1 is a general view in side elevation of the machine showing the arrangement and relation of the several parts, with portions thereof shown in section to bring out more clearly the construction thereof, Figure 2 is a view in front elevation of the wrapping machine showing the parts of the feeding mechanism to which the invention relates, Figure 3 is an enlarged detailed view in vertical section taken on line 3—3 of Figure 1, Figure 4 is a detailed view in side elevation, showing the operating mechanism of the oscillating cylinder or valve at the lower end of the gravity conveyor, Figure 5 is an enlarged detailed view in front elevation of the upper portion of the gravity conveyor or chute with front cover plate removed, Figure 6 is a top plan view of the upper portion of the gravity conveyor and the outer portion of the horizontal conveying mechanism, Figure 7 is an enlarged detailed view in side elevation showing the parts associated with the primary wrapping drum in the positions immediately prior to the introduction of the contents of a package into the drum, Figure 8 is a similar view of the parts shown in Figure 7 in the position immediately after the contents of a package have been introduced into the wrapping drum, Figure 9 is a detailed view in horizontal section taken on line 9—9 of Figure 2, showing the construction of the inclined chute of the gravity conveyor, Figure 10 is a perspective view of the guide frame associated with the conveyor belt, Figure 11 is a perspective view of the oscillating cylinder or valve at the lower end of the gravity conveyor, and Figure 12 is a perspective view of a package completely wrapped and in the form in which they are discharged from the machine.

The main frame 1 of the machine is supported upon a pedestal 2 and comprises a rectangular open frame comprising vertical and horizontal frame members 3 which support the several parts of the wrapping mechanism as well as the feeding mechanism, these parts being supported and actuated by a suitable arrangement of driven shafts, intermeshing gear wheels, sprockets and sprocket chains, all being journalled in suitable bearings mounted upon the main frame 1. Extending vertically above the main frame are vertical standards 4—4 provided at their upper end with transverse arms 5—5 which support a feed hopper 6, rollers 7—7 which carry an endless conveyor belt 8, and other parts associated therewith and operative to assist in the arrangement of the articles during their advancement toward the wrapping mechanism. As clearly shown in Figure 1, the feed hopper 6 and parts immediately associated therewith are located above the wrapping mechanism hereinafter to be described, so that the feeding of the articles to said wrapping mechanism is accomplished largely by gravity, although a portion of its movement is accomplished by mechanical means; namely, by the conveyor belt 8, which receives the articles from the hopper and advances them horizontally from left to right and discharges them into a chute or gravity conveyor 9 whereby they are advanced downwardly by gravity to a point immediately adjacent to the primary wrapping drum 10. An oscillating cylindric valve 11, with the parts associated therewith, controls the introduction of the articles from the lower end of the gravity conveyor 9 into the wrapping mechanism.

Referring further to the parts immediately associated with the feed hopper 6, there are mounted upon the transverse arms 5 of the vertical standards 4, two horizontally spaced vertical plates 12—12 which form between them a channel within which is contained the conveyor belt 8 and the rollers 7—7 thereof, said rollers being journalled at their ends in said plates 12—12, the rearmost roller having its journal rod 13 adjustably mounted in a longitudinal slot 12ª and connected with a suitable form of adjusting device 14 whereby the roller 7 may be moved horizontally in order to vary the tension of the belt 8.

Mounted immediately above the conveyor belt 8 and extending longitudinally throughout its length is a guide frame 15 (Figures 1, 3 and 10) consisting of a series of parallel and vertically disposed strips 16 of metal jointed at their ends by means of cross bars 17—17. This frame 15 is supported between the upper ends of the plates 12—12 and immediately above the surface of the upper lead of the belt 8, the latter preferably being supported by a horizontal plate 18 (Figure 3) extending transversely beneath the belt and longitudinally between the rollers 7—7 thereof. The hopper 6 is of the usual construction, having a large intake opening, its walls tapering downwardly to a comparatively small discharge opening immediately above the rear end of the conveyor belt 8. As a preferable construction, the hopper is provided with flanges 6ª surrounding the discharge opening, these flanges resting upon the longitudinally extending plates 12—12 and the adjacent cross bar 17 of the frame 15 and secured in place by means of screws.

By this arrangement, it will be seen that as a large number of the articles are fed into the hopper, they will be discharged from the lower end thereof onto the upper lead of the conveyor belt 8 which may be assumed to be moving forwardly or from left to right, as in Figure 1, movement being imparted to the conveyor belt by means of a sprocket wheel 19 mounted at one end of the journal rod 13 of the forward roller 7, which is driven from a similar sprocket wheel 20 through the medium of a sprocket chain 21, said sprocket wheel being mounted upon a driven shaft 22 journalled in the main frame 1. The vertical strips 16 constituting the frame 15, are spaced apart a distance substantially equal to the width of the articles, so that as they are discharged from the hopper onto the belt 8, they will tend to enter the passageways formed between said strips, and to become arranged end to end and flatwise within said passageways as they are carried forward upon the conveyor belt.

To assist in the uniform arrangement of the articles as hereinbefore indicated, a pair of rotative brushes are employed, which are located immediately above the conveyor belt 8 and between the hopper and the discharge end of said belt. These brushes (clearly shown in Figures 1, 2 and 3) are preferably two in number, and are arranged as follows: The brush 23 located immediately adjacent the discharge end of the hopper consists of a roller having radially projecting bristles extending therefrom, the periphery of said bristles just clearing the upper surface of the frame 15. The other brush 24 mounted adjacent the outer end of the belt 8 is similarly constructed, its bristles being somewhat longer so that the ends thereof extend downwardly into the passageway between the strips 16 of the frame 15. The rotary brushes 23 and 24 are journalled in suitable bearings and are driven through the medium of a train of gear wheels arranged as shown in Figure 1, and consisting of a gear wheel 25 which meshes with a similar gear wheel 26 carried by the journal rod 13 of the forward belt roller 7, and a gear wheel 27 carried by the rotary brush 24. The gear wheel 27 in turn meshes with an intermediate gear wheel 28 which in turn meshes with a gear wheel 29 carried by the rotary brush 23. By this arrangement of gear wheels, the rotary brushes are actuated from the same source as the conveyor belt 8; namely, the sprocket chain 21 and driven shaft 22. It is to be further observed that the direction of rotation of the rotary brushes 23 and 24, as indicated by the arrows, is opposed to the direction of movement of the conveyor belt 8, and likewise of the articles being advanced thereby. This being the case, it is clear that the action of these rotary brushes is to retard, to some extent, the forward movement of the articles, and particularly those which are not properly positioned within the passageways formed between the strips 16—16. In other words, the rotary brushes are constantly operating to assist in the proper arranging of the articles during their advancement by the conveyor belt 8, the rearmost rotary brush 23 assisting in the initial distribution and arrangement of the articles, and the foremost rotary brush 24 assuring their proper arrangement before being discharged from the belt 8 into the gravity conveyor beyond.

Referring now more in detail to the gravity conveyor or chute 9, the same is in reality a series of chutes communicating with the forward end of the conveyor belt, and more particularly with the passageways along which the articles are advanced. The chute 9 may be considered as consisting of two portions; namely, an upper portion 30, which receives the articles from the conveyor belt, and guides them through an angle of 90 degrees in a downward direction, as well as altering the positions of the several pieces at the same time, and the lower or inclined portion extending between the lower end of the portion 30 and the valve 11.

Referring more in detail to the upper portion 30 of the gravity conveyor 9, it is manifest that it comprises a plurality of chutes, each of which is arranged in alignment with and forms a continuation of a corresponding passageway of the guide frame 15. As shown in Figures 5 and 6, the portion 30 has the form of a casing consisting of substantially parallel rear and front walls 32 and 33, the latter being preferably hinged at its lower edge at 33ª—33ª in order that it may be readily removed to permit access to the interior of the casing. The rear wall terminates at its upper end adjacent to the belt 8, and in the form of a horizontal lip 32ª lying substantially in the plane of the belt, and curving downwardly through an arc of 90 degrees to a vertical position. Integral with the wall 32 and extending throughout the horizontal lip, and the curved portion of the wall, are a series of parallel ribs 34 arranged in horizontal alignment with the strips 16 of the conveyor frame 15. Throughout the vertical portion of the wall 32, the ribs 34 assume a formation such as illustrated in Figures 5 and 6, which may be best described as twisted or warped in helical form originating in transversely extending flanges 35 projecting from the edges of the ribs 34 and which gradually taper toward their lower ends, the ribs 34 themselves assuming a helical conformation, combined with a gradual narrowing of the space between them, effected by gradually increasing the thickness of the ribs, as at 36. By this treatment, of the passages or chutes, it will be seen that as the lozenge shaped pieces enter the upper ends of the chutes in their original flatwise positions, that is, lying on their faces of greater area, they are revolved or turned in passing through the warped portions of the passages, so that they issue therfrom in a vertical and edgewise position. To accommodate the rearrangement or revolving of the articles during their passage through the casing, the walls 32 and 33 gradually diverge, as shown in Figure 1, toward the lower or discharge end thereof. The casing 30 is removably connected to the under side of the arm 5 of the forward standard 4 by means of a bracket 37 which receives a rearwardly extending rod 38 fixed to the rear wall 32 of the casing. A thumb screw 37ª serves to anchor the rod 38 within the bracket.

The inclined portion 31 of the gravity conveyor 9, as before suggested, comprises a series of chutes which form a continuation of the portion 30 just described. It also consists of a casing having front and rear walls 40 and 41 (Figure 9), there being formed integral with said rear wall a series of projecting ribs or flanges 42, between which are formed the channels or individual chutes 43. The front wall 41 is preferably a glass plate that fits over the front of the casing; thus the passage of the articles through the chutes may be observed at all times by the operator of the machine. Integral with the rear wall 41 are tubular brackets 44 which engage a supporting rod 45 projecting laterally from the vertical frame standard 4 adjacent to the gravity conveyor, clearly shown in Figure 2. The lateral edges of the chute 31 converge toward the lower end thereof, as do the several channel forming flanges 42, so that the articles are guided inwardly toward the center line as they advance downwardly, thus upon reaching the lower ends of the chutes, they will have been brought closely together, and within the limits of the desired length of package. Manifestly, the channels or chutes 43 of the portion 31 communicate at their upper ends with the corresponding passages of the upper portion 30, as shown in Figure 5. Thus the movement of the articles is continuous, and furthermore, in series of transverse rows, one behind the other, throughout the entire length of the gravity conveyor. The lower ends of the chutes are open, although the discharge of the articles is controlled by means of the oscillating cylinder or valve 11, the operation and purpose of which will now be considered.

Referring to the cylindric valve 11 illustrated in Figure 11, the same is as already suggested, cylindric in shape, and is provided throughout its length with a series of transverse slots 45 separated by relatively thin partition walls 46, these slots, as will presently be seen, register with the several chutes of the gravity conveyor. The location of the valve 11 is clearly indicated in Figures 7 and 8; namely, immediately below the lower end of the chutes 43 and in such position that each of said chutes registers with a corresponding slot 45 in said valve when the latter is rotated to a position such that the slots are vertical as in Figure 7, thus permitting a complete transverse row of the articles, such as A, to pass by gravity into the slots.

The cylindric valve 11 is rotatively mounted in and supported by a valve block 47 having a semi-cylindric valve seat surrounding the lower and inner portions of the valve. The block 47 is preferably mounted upon a transverse shaft or rod 48 and capable of movement thereon to permit endwise adjustments of the valve as may be required. A set screw 49 serves to fix the block in the desired position of adjustment upon the rod 48. The block 47, as before suggested, surrounds one side of the valve; namely, that side adjacent to the primary wrapping drum 10, there being provided in said block a horizontal slot 47$^a$ adapted to register with the slots 45, when the valve is rotated to a position such that the slots assume a horizontal position, as in Figure 8.

The movement of the valve may be described as an oscillatory or rocking movement through an angle of 90 degrees; that is, from the position of Figure 7 to the position of Figure 8, in a counterclockwise direction and reverse. The actuating mechanism for effecting this movement may now be described. The valve 11 is provided at its ends with journal pins 11$^a$—11$^a$, Figure 11, journalled in suitable bearings, one of said pins being extended or provided with an extension which projects through a vertical cheek plate 50 of the main frame 1. Fixed to the end of the extended journal pin 11$^a$ is an arm 51 (Figure 4) which is connected with one arm of a rocking lever 52 by means of a vertical link 53, the same end of the lever arm having attached thereto a spring 55 anchored to the frame at the point 55$^a$. The lever is pivoted intermediate its ends upon a journal bearing bracket 54 fixed to the plate 50. At the other end of the lever 52 is mounted a cam roller 52$^a$ which engages a quick motion cam plate 56 mounted upon a uniformly rotating shaft 57. The cam plate is so designed as to transmit to the valve 11, through the arrangement of the intermediate lever and link, the oscillating or rocking motion hereinbefore described.

Associated with the oscillating valve 11 and its mechanism, is a device adapted to operate in conjunction therewith for the purpose of forcing or projecting the articles from the valve 11 into the primary wrapping drum 10. This device has the form of a vertical rocker arm 58, provided at its lower end with a stub shaft 58$^a$ journalled in a bearing sleeve 59 integral with a bracket 59$^a$ fixed to the outer face of the cheek plate 50. The upper portion of the arm is slightly inclined in a direction away from the valve 11 and is provided at its upper extremity with cross bar 60 extending parallel to the valve 11 and from which project a series of push rods 61, extending at right angles to the bar 60 and toward said valve 11, the arrangement of said rods being not unlike the tines of a rake. These push rods are of the same number as the slots 45 of the valve and are so located that each rod registers with a corresponding slot; thus when the arm 58 is rocked back and forth, the rods will enter the slots 45 and force the articles A therefrom into the receiving slot of the wrapping drum 10, as shown in Figure 8. Manifestly the movement of the arm 58 is accurately synchronized with the oscillatory movement of the valve, so that the former moves forward and engages the slots 45 when the latter comes to rest with the slots in horizontal position. The rocking motion is imparted to the arm 58 by means of an eccentric sheave 62 mounted upon the shaft 57, which carries an eccentric strap 63 connected to the arm 58 at a point substantially midway between its ends, there being provided a suitable pivotal connection as at 58$^b$. As a preferable construction, the upper portion of the arm 58 is bifurcated throughout its upper end portion, and the pivotal connection referred to, made adjacent the base of the bifurcation. A hand wheel 57$^a$, Figure 2, is mounted at the end of the shaft 57 to permit the slow operation of the machine by hand, as when making adjustments.

As before indicated, the oscillating valve 11, together with the rocker arm 58 and push rods 61 are interposed between the gravity conveyor 9, and the wrapping mechanism proper of the machine. The primary wrapping drum 10 has already been referred to, and will now be described more in detail, and in connection with other parts of the wrapping mechanism, such description being more or less general inasmuch as the specific details of the wrapping mechanism forms no part of the present invention.

The primary wrapping drum comprises a cylindric member rotative about a horizontal axis extending parallel to the axis of the oscillating valve 11. In the surface of the drum and diametrically opposed points, are longitudinally extending pockets or recesses 62—62, Figures 7 and 8. Secured to each end of the drum is a plate 63 provided with pairs of fingers 64 which project over the ends of the pockets 62, and function in the folding of the end flaps of the wrapper. Mounted within the pockets are ejector plates 65—65 adapted to slide radially inwardly and outwardly within said pockets. Although the structure is not shown, these plates are preferably joined together so that they operate as a unit, but in a reverse order of movement, that is to say, when one plate is moving outwardly, the other plate is moving inwardly with respect to their associated pockets 62. These plates are actuated in alternate directions by the feeding of the articles into the pockets, as will hereinafter be pointed out. Immediately above the wrapping drum 10 is a vertical standard 66 which carries at its upper end a pair of guide rolls 67—67, and at a point adjacent its base and immediately above the drum 10, a pair of feed rolls 68—68. At the end of an upwardly inclined arm 69 extending rearwardly from the upper portion of the rearmost vertical standard 4, is mounted a roll of wrapping material 70, preferably a waxed or paraffined paper. The central core of the roll 70 is fitted upon a rotative spindle 71 which in turn is rotatively mounted upon a bearing 72. The material is fed from the roll 70 in the form of a continuous strip 73, which passes between the upper pair of guide rolls 67—67, and thence downwardly between the feed rolls 68—68. From the last mentioned pair of rolls, the strip passes downwardly between fixed and movable cutter members 74 and 75, the latter being journalled at 76 upon a rock shaft which is actuated by suitable driving mechanism properly synchronized with the movement of other parts of the material feeding mechanism so that sheets of the material such as 77 (Figure 8) are successively cut from the end of the strip.

In describing the operation of the parts in the manner in which the articles are introduced into the wrapping drum 10, let it be assumed that a quantity of the articles to be wrapped have been introduced into the hopper 6 and by means of a conveyor belt 8, the rotary brushes 23 and 24 and the vertical chutes of the gravity conveyor 9, that the articles reach the lower end inclined chute 31 in the form shown in Figures 7 and 8; that is, transverse rows of articles such as A, A¹, A². Now let it be assumed further that the first row A has passed from the chute 31 and entered the slots 45 of the oscillating valve 11, this member having been rotated to a position in which the slots are vertical and register with the lower ends of the several chutes. In this position the row of articles A are completely enclosed within the slots 45, the rocker arm 58 and push rod 61 are withdrawn from the valve 11 and the wrapping drum 10 is in such position that the pockets 62—62 thereof are vertically disposed and out of registering relation with the slot 47ª of the block 47.

Now let it be assumed that the valve 11 is rotated through an angle of 90 degrees in a counter-clockwise direction, and that simultaneously with this movement the rocker arm 58 is thrown forwardly by the rotation of the cam shaft 57 in a counter-clockwise direction. During this interval the wrapping drum 10 is rotated in a clockwise direction from the position of Figure 7 to the position of Figure 8, and at the same time the continuous strip of paper 73 is fed between the cutting members 74 and 75, and thence downwardly between two guide plates 78 and 79 located immediately adjacent to the drum in the position shown in Figure 8. The wrapping drum now comes to rest in the position shown in Figure 8 so that the uppermost pocket 62 (Figure 7) is now horizontally disposed and in registering relation with the slot 47ª, and the strip of paper 73, delivered in front of the active pocket 62. The valve 11 having now come to rest in registration with the slot 47ª, and likewise into registration with the active pocket 62, the push rods 61 engages the individual articles A, forcing them in a horizontal direction through the slot 47ª, and into the pocket 62 waiting to receive them. In being introduced into the pocket the articles manifestly engage the paper strip, forcing the same ahead into the pocket and effecting the enclosure of the articles on three sides thereof by said sheet, in the manner clearly shown in Figure 8. At the instant the articles engage the paper sheet 77, the cutting members 74 and 75 are actuated so as to completely sever the sheet 77 from the strip 73.

The parts having assumed the position shown in Figure 8, the rocker arm 58 is immediately actuated in the opposite direction to its original position shown in Figure 7, the valve 11 is rotated in a clockwise direction to the position of Figure 7 (thereby permitting the next row of articles A¹ to enter the slots 45 thereof), and the wrapping drum 10 continues its rotation in a clockwise direction, again coming to rest when the pocket 62 containing the articles A passes through an angle of 180 degrees, which brings the other pocket 62 in registration with the valve 11, and in position to receive the next row of articles A². During the travel of the articles A within the drum, certain folding members operate which completes the wrapping of the articles, as well as the folding of the ends of the package, so that when it arrives at the last mentioned position, the package is in readiness to be discharged from the drum. This is accomplished simultaneously with the introduction of the successive row of articles A¹ into the opposite pocket by the movement of the ejector plates 65—65, the one being forced inwardly by the entrance of the articles into the drum pocket, and the corresponding outward movement of the other plate, which forces the wrapped package from its pocket in a direction to the left, whereupon it passes into a slot formed within a sealing device 80 located immediately to the left of the drum 10, as shown in Figure 1. The sealing device 80 comprises an electric heating unit or element which comes into contact with the overlapping margins of the wrapping sheet, along one side of the package, thus partially sealing the same. The discharge of the following package from the drum 10 forces the partially sealed package ahead of it, from the sealing device 80 and into a secondary wrapping drum 81 constructed in a manner similar to the primary wrapping drum 10. The drum 81 comprises pockets 82—82 similar in all respects to the pockets 62—62 of the drum 10, as well as ejector plates not shown. The drum 81 rotates in the same direction and at the same speed as the drum 10, and the pockets of both drums are so positioned in relation to each other that a package discharged from the sealing device 80 is received into one of the pockets of the drum 81. Associated with the drum 81 and located immediately above the same is a vertical magazine 83 in which is contained a number of outside wrapping sheets or labels 84. These labels are fed individually from the lower end of the magazine 83 in a direction toward the drum 82 and over a roller 85. A horizontally moving arm 86 which is actuated with a reciprocating movement, and which is provided at its forward end with a pointed finger 86ᵃ advances each outside wrapper or label forwardly toward the drum 81 and into slots 87 formed in the periphery thereof, as said slots are brought into a position in alignment with the forward edge of the label as it is fed from the magazine. Co-operating with the slots 87 are small cylinders 88 provided with notches in their surfaces which engage the edges of the label as it enters the slots 87 and immediately thereafter the cylinders are partially rotated so as to securely grip the edge of the label. As the cylinder 81 continues its rotation, the label extends over the pocket 82 immediately following so that when the package is introduced into the pocket the label is carried thereby into said pocket and is partially folded about said package. With the aid of co-operating folding members, the labels are completely wrapped around the package and sealed by the application of adhesive. In a manner similar to that described in connection with the primary wrapping drum 10, the packages with the labels applied are successively discharged by means of the ejector plates onto a delivery track 89, and advanced rearwardly along the same. Located on opposite sides of the delivery platform, and in a position to engage the ends of each package are sealing elements 90—90. These sealing elements 90 consist of electrical heating units which effect the sealing of the end flaps in much the same manner as the sealing elements 80 hereinbefore described. After the final sealing operation is completed, the packages are completely finished and are ready for packing in cartons, or for otherwise being disposed of.

Although I have illustrated and described a preferable structure for a machine embodying the features of my invention, it is to be understood that the scope of the invention is not to be limited to the foregoing subject matter except in so far as it is specifically set forth in the appended claims.

I claim as my invention:

1. In a wrapping machine, the combination of an article conveyor comprising elements acting successively to arrange the articles into successive rows of package form, a valve at the discharge end of said conveyor adapted to receive successive rows of articles, and means co-acting with said valve for discharging the rows successively from said valve.

2. In a wrapping machine, the combination of an article conveyor comprising elements acting successively to arrange the articles into successive rows of package form, a valve at the discharge end of said conveyor movable into one position to receive successive rows of articles and into another position to discharge said rows, and means co-acting with said valve and operative in the discharging position thereof to impel the rows of articles therefrom.

3. In a wrapping machine, the combination of a hopper, a conveyor comprising a series of vertical chutes, means for arranging said articles in rows and discharging the same into said chutes, a valve at the lower end of said chutes adapted in one position to receive successive rows of articles in package form, and in another position to close the ends of said chutes, and a reciprocating impelling member operative in the chute closing position of said valve to discharge the rows of articles therefrom.

4. In a wrapping machine, the combination of a feed hopper into which a quantity of lozenge-shaped articles are fed, a conveyor communicating with said hopper and adapted to effect the uniform arrangement of the articles into package form during the advancement of the same therethrough, a rotative valve mounted at the discharge end of said conveyor and provided with an article-receiving slot adapted to register intermittently with said conveyor, and coacting means for discharging said articles from said valve.

5. In a wrapping machine, the combination of a feed hopper adapted to receive a quantity of lozenge shaped articles, a conveyor communicating with said hopper and adapted to arrange the articles uniformly in transverse rows of package form, an oscillating cylindric valve mounted at the discharge end of the conveyor, and provided with an article receiving slot adapted to receive successive rows of the articles and means for impelling successive rows of articles through said slot, comprising a rocker arm provided with article engaging members registering with the slot of said valve.

6. In a wrapping machine, the combination of a feed hopper adapted to receive a quantity of lozenge-shaped articles, a conveyor communicating with said hopper and adapted to arrange the articles uniformly in transverse rows of package form, a cylindric valve mounted at the discharge end of said conveyor and provided with an article-receiving slot adapted in one position of the valve to register with the conveyor and to be rotated into another position for discharging the articles therefrom, and an article impelling member operative in the article discharging position to force the same from said valve.

7. In a wrapping machine, the combination of a feed hopper adapted to receive a quantity of lozenge shaped articles, a conveyor communicating with said hopper and adapted to arrange the articles uniformly in transverse rows of package form, a cylindric valve member mounted at the discharge end of said conveyor, and provided with an article receiving slot adapted in one position of the valve to receive a row of the articles, and in another position to close the end of said conveyor, and a rocker arm provided with a series of push rods adapted to engage each of the articles in said last mentioned position of the valve, and to impel the same from said valve.

In witness whereof, I hereunto subscribe my name this 22 day of July, A. D. 1920.

CHARLES W. JOHNSON.